(12) United States Patent
Rae et al.

(10) Patent No.: US 12,443,851 B2
(45) Date of Patent: *Oct. 14, 2025

(54) AUGMENTING ATTENTION-BASED NEURAL NETWORKS TO SELECTIVELY ATTEND TO PAST INPUTS

(71) Applicant: DeepMind Technologies Limited, London (GB)

(72) Inventors: Jack William Rae, London (GB); Anna Potapenko, London (GB); Timothy Paul Lillicrap, London (GB)

(73) Assignee: GDM Holding LLC, Mountain View, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 18/486,060

(22) Filed: Oct. 12, 2023

(65) Prior Publication Data

US 2024/0046103 A1 Feb. 8, 2024

Related U.S. Application Data

(63) Continuation of application No. 17/033,396, filed on Sep. 25, 2020, now Pat. No. 11,829,884.

(Continued)

(51) Int. Cl.
*G06N 3/04* (2023.01)
*G06F 18/214* (2023.01)
(Continued)

(52) U.S. Cl.
CPC ......... *G06N 3/084* (2013.01); *G06F 18/2148* (2023.01); *G06N 3/047* (2023.01); *G06N 3/08* (2013.01)

(58) Field of Classification Search
CPC ................................ G06N 3/044; G06N 3/08
See application file for complete search history.

(56) References Cited

U.S. PATENT DOCUMENTS

2017/0200077 A1 7/2017 Weston et al.
2018/0336884 A1 11/2018 Sriram et al.
(Continued)

FOREIGN PATENT DOCUMENTS

CN 110168573 A 8/2019
CN 110192206 A 8/2019
(Continued)

OTHER PUBLICATIONS

Ba et al., "Layer Normalization," CoRR, Jul. 2016, arxiv.org/abs/1607.06450, 14 pages.
(Continued)

*Primary Examiner* — Hal Schnee
(74) *Attorney, Agent, or Firm* — Fish & Richardson P.C.

(57) ABSTRACT

Methods, systems, and apparatus, including computer programs encoded on a computer storage medium, for performing a machine learning task on a network input that is a sequence to generate a network output. In one aspect, one of the methods includes, for each particular sequence of layer inputs: for each attention layer in the neural network: maintaining episodic memory data; maintaining compressed memory data; receiving a layer input to be processed by the attention layer; and applying an attention mechanism over (i) the compressed representation in the compressed memory data for the layer, (ii) the hidden states in the episodic memory data for the layer, and (iii) the respective hidden state at each of the plurality of input positions in the particular network input to generate a respective activation for each input position in the layer input.

20 Claims, 4 Drawing Sheets

Related U.S. Application Data (60) Provisional application No. 62/906,078, filed on Sep. 25, 2019.

(51) Int. Cl.
   *G06N 3/047*    (2023.01)
   *G06N 3/08*     (2023.01)
   *G06N 3/084*    (2023.01)

(56) References Cited

U.S. PATENT DOCUMENTS

2019/0251439 A1  8/2019  Zoph et al.
2020/0184327 A1  6/2020  Dey et al.
2021/0089867 A1  3/2021  Byeon et al.

FOREIGN PATENT DOCUMENTS

JP    201975088         5/2019
WO    WO 2017/201444    11/2017
WO    WO 2018/212710 A1 11/2018
WO    WO 2019/081782    5/2019

OTHER PUBLICATIONS

Child et al., "Generating long sequences with sparse transformers," CoRR, Apr. 2019, arXiv:1904.10509, 10 pages.
Dai et al., "Transformer-XL: Attentive language models beyond a fixed-length context," CoRR, Jan. 2019, arxiv.org/abs/1901.02860, 20 pages.
Decision to Grant Patent in Japanese Appln. No. 2022-519300, dated Nov. 20, 2023, 5 pages (with English translation).
Devlin et al., "Bert: Pre-training of deep bidirectional transformers for language understanding," CoRR, Oct. 2018, arxiv.org/abs/1810.04805, 16 pages.
International Preliminary Report on Patentability in Appln. No. PCT/EP2020/076759, dated Mar. 15, 2022, 10 pages.
Ke et al., "Sparse Attentive Backtracking: Temporal Credit Assignment Through Reminding," CoRR, Sep. 2018, arxiv.org/abs/1809.03702, 13 pages.
Lazaridis et al., "Capturing sensor-generated time series with quality guarantees," Proceedings 19th International Conference on Data Engineering (Cat. No. 03CH37405), Mar. 2003, 13 pages.
Li et al., "Enhancing the Locality and Breaking the Memory Bottleneck of Transformer on Time Series Series Forecasting," CoRR, Jun. 2019, arxiv.org/abs/1907.00235, 13 pages.
Notice of Acceptance for Patent Application in Australian Appln. No. 2020352594, dated Sep. 11, 2023, 3 pages.
Office Action in Australian Appln. No. 2020352594, dated Jan. 31, 2023, 3 pages.
Office Action in Australian Appln. No. 2020352594, dated Jun. 13, 2023, 2023, 4 pages.
Office Action in Canadian Appln. No. 3,155,096, dated May 19, 2023, 4 pages.
Office Action in European Appln. No. 20781464.1, dated Nov. 27, 2023, 12 pages.
Office Action in Japanese Appln. No. 2022-519300, dated Jul. 18, 2023, 5 pages (with English translation).
PCT International Search Report and Written Opinion in Appln. No. PCT/EP2020/076759, dated Feb. 1, 2021, 16 pages.
Pengfei et al., "Multi-timescale long short-term memory neural network for modelling sentences and documents," Proceedings of the 2015 conference on empirical methods in natural language processing, Sep. 17-21, 2015, pp. 2326-2335.
Shiyang et al., "Enhancing the Locality and Breaking the Memory Bottleneck of Transformer on Time Series Forecasting," Advances in Neural Information Processing Systems 32 (NeurIPS 2019), 2019, 11 pages.
Soltani et al., "Higher order recurrent neural networks," CoRR, Apr. 30, 2016, arXiv:1605.00064, 9 pages.
Sukhbaatar et al., "Adaptive attention span in transformers," CoRR, May 2019, arxiv.org/abs/1905.07799, 5 pages.
Vaswani et al., "Attention is all you need," Advances in Neural Information Processing Systems 30, 2017, 11 pages.
Wu et al., "Pay less attention with lightweight and dynamic convolutions," CoRR, Jan. 2019, arXiv:1901.10430, 14 pages.
Office Action in Israel Appln. No. 291346, dated May 15, 2024, 4.
Office Action in Chinese Appln. No. 202080067175.8, dated Oct. 31, 2024, 33 pages (with English translation).
Notice of Allowance in Chinese Appln. No. 202080067175.8, mailed on Jun. 2, 2025, 6 pages (with English translation).

AUGMENTING ATTENTION-BASED NEURAL NETWORKS TO SELECTIVELY ATTEND TO PAST INPUTS

CROSS-REFERENCE TO RELATED APPLICATION

This application is a continuation of U.S. patent application Ser. No. 17/033,396, filed on Sep. 25, 2020, which claims priority to U.S. Provisional Application No. 62/906,078, filed on Sep. 25, 2019. The disclosure of the prior applications is considered part of and are incorporated by reference in the disclosure of this application.

BACKGROUND

This specification relates to neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that implements a neural network configured to perform a machine learning task on a network input to generate a network output. Notably, the neural network is a memory-augmented, attention neural network in data communication with one or more memory devices that maintain (i) a short-term, granular memory, also referred to as an episodic memory, which stores relatively recent (e.g., in terms of time, sequence, or position) information generated by each of one or more layers of the neural network when performing the task, and (ii) a longer-term, coarse memory, also referred to as a compressed memory, which stores older information generated by each of the one or more layers of the neural network when performing the task. The system can make use of the information stored at both types of memory when generating the network output from the network input.

In general, one innovative aspect of the subject matter described in this specification can be embodied in methods for processing a sequence of network inputs each having a respective input at each of a plurality of input positions using a neural network to generate a network output, the neural network having a plurality of attention layers that each apply an attention mechanism over a layer input that includes a respective hidden state at each of the plurality of input positions to generate a respective activation for each input position. The method comprises, for each particular network input in the sequence: for each attention layer in the neural network: maintaining corresponding episodic memory data that includes respective hidden states that were processed by the attention layer for a first portion of previous network inputs that precede the particular network input in the sequence; maintaining corresponding compressed memory data that includes a compressed representation of respective hidden states that were processed by the attention layer for a second portion of previous network inputs that precedes the first portion of previous network inputs in the sequence; receiving a layer input to be processed by the attention layer during the processing of the particular network input using the neural network; and applying an attention mechanism over (i) the compressed representation in the compressed memory data for the layer, (ii) the hidden states in the episodic memory data for the layer, and (iii) the respective hidden state at each of the plurality of input positions in the particular network input to generate a respective activation for each input position in the layer input.

The method may further comprise updating the episodic memory data to include the respective hidden states for each input position in the particular network input; and updating the compressed memory data to include a compressed representation of the respective hidden states for an earliest network input in the first portion of previous network inputs. Updating the compressed memory data to include a compressed representation of respective hidden states for an earliest network input in the first portion of previous network inputs may comprise: determining a compression rate; compressing the respective hidden states for the earliest network input and the respective hidden states that were processed by the attention layer for the second portion of previous network inputs in accordance with the compression rate to generate a compressed representation; and modifying the compressed memory data to include the generated compressed representation. The method may further comprise removing the respective hidden states for the earliest network input in the first portion of previous network inputs from the episodic memory data. Compressing the respective hidden states for the earliest network input and the respective hidden states that were processed by the attention layer for the second portion of previous network inputs in accordance with the compression rate may comprise: applying a max pooling function to the respective hidden states for the earliest network input and the respective hidden states that were processed by the attention layer for the second portion of previous network inputs with a stride equal to the compression rate. Compressing the respective hidden states for the earliest network input and the respective hidden states that were processed by the attention layer for the second portion of previous network inputs in accordance with the compression rate may comprise: applying a mean pooling function to the respective hidden states for the earliest network input and the respective hidden states that were processed by the attention layer for the second portion of previous network inputs with a stride equal to the compression rate. Compressing the respective hidden states for the earliest network input and the respective hidden states that were processed by the attention layer for the second portion of previous network inputs in accordance with the compression rate may comprise: sorting the respective hidden states for the earliest network input and the respective hidden states that were processed by the attention layer for the second portion of previous network inputs in descending order of respective activation weights that are associated with the plurality of input positions in the earliest network input and the second portion of previous network inputs; and discarding respective hidden states for positions in the earliest network input and the respective hidden states that were processed by the attention layer for the second portion of previous network inputs that are associated with the lowest activation weights. Compressing the respective hidden states for the earliest network input and the respective hidden states that were processed by the attention layer for the second portion of previous network inputs in accordance with the compression rate may comprise: determining a kernel size for a 1D convolution function; and applying the 1D convolution function to the respective hidden states for the earliest network input and the respective hidden states that were processed by the attention layer for the second portion of previous network inputs with a stride equal to the compression rate and a kernel size equal to the determined kernel size. Compressing the respective hidden states for the earliest network input and the respective hidden states that were processed by the attention layer for the second portion of previous network inputs in accordance with the compression rate may comprise: applying a multi-layer dilated 1D convolution function to the respective hidden states for the earliest network input and the respective hidden states that were processed by the attention layer for the second portion of previous network inputs. In some implementations, the particular network inputs are inputs that are preceded by at least a predetermined threshold number of network inputs in the sequence. The method may further comprise, for each of a plurality of earlier network inputs that are preceded by less than the predetermined threshold number of network inputs: for each attention layer in the neural network: maintaining corresponding episodic memory data that includes respective hidden states to be processed by the attention layer for previous network inputs that precede the earlier network input; receiving a layer input to be processed by the attention layer during the processing of the earlier network input using the neural network; applying an attention mechanism over (i) the hidden states in the episodic memory data for the layer, and (ii) the respective hidden state at each of the plurality of input positions in the earlier network input to generate a respective activation for each input position in the layer input; and updating episodic memory data to include the respective hidden states for each input position in the earlier network input. In some implementations, the predetermined threshold number of network inputs is defined by the predetermined threshold value of the size of the episodic memory data. In some implementations, the episodic memory data and the respective hidden states for each input position in the particular network input are represented as respective multi-dimensional arrays; and updating the episodic memory data to include the respective hidden states for each input position in the particular network input may comprises: concatenating the two multi-dimensional arrays along a same dimension of the multi-dimensional arrays. In some implementations, the neural network may further comprise one or more fully connected layers, one or more layer normalization layers, one or more activation layers, or one or more convolutional layers. The method may further comprise training the neural network on training data to repeatedly update current values of the network parameters, wherein during training: gradually increasing a number of training neural network inputs between every two consecutive updates. The method may further comprise, during training: applying a stop gradient to (i) the compressed representation in the compressed memory data for the layer and (ii) the hidden states in the episodic memory data for the layer.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

Particular embodiments of the subject matter described in this specification can be implemented so as to realize one or more of the following advantages.

In general, training a neural network to capture long-term dependencies within a sequence of network inputs can be difficult. Conventional approaches to address this limitation include maintaining, at each attention layer of the neural network, a memory that includes representation of respective hidden states for each input position of previous network inputs, therefore enabling the attention layers to attend over a longer sequence of network input. However, maintaining (i.e., storing and updating) such memory data has various problems. The first is that it consumes substantial computational resources (e.g., memory, computing power, or both). The second is that oldest representations in the memory must be dropped once a maximum size of the memory has been reached, thus limiting the amount of representations that the network can attend to.

The techniques described in this specification, however, allow a system to maintain, at each attention layer of the neural network, a compressed memory data that includes a compressed representation of respective hidden states for each input position of the oldest network inputs. That is, the techniques allows the system to effectively compress the respective hidden states for each input position of the oldest network inputs into a compressed memory.

By compressing the oldest hidden states rather than discarding them, this technique allows the neural network to consider context even if the context occurred in the distant past relative to the input being currently processed. Because the oldest hidden states are compressed, this additional context is available with minimal computational overhead. Implementations of the neural network are able to preserve salient information from the past.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that performs a machine learning task on a network input.

The machine learning task can be any machine learning task that (i) operates on a network input that is an input sequence (i.e., a sequence of inputs each having a respective input at each of a plurality of input positions), (ii) generates a network output that is an output sequence, or (iii) both.

Some examples of machine learning tasks that the system can be configured to perform follow.

As one example, the machine learning task may be neural machine translation, where the input to the neural network is a sequence of text in one language and the output generated by the neural network may be a score for each of a set of pieces of text in another language, with each score representing an estimated likelihood that the piece of text in the other language is a proper translation of the input text into the other language. Thus for example each input position may be derived from a word in one language and the network output may comprise an output sequence providing a translation of the words into the other language, e.g. which has output positions corresponding to the input positons and in which an output position provides data for a word in the other language.

As another example, the task may be an audio processing task. For example, if the input to the neural network is a sequence representing a spoken utterance, the output generated by the neural network may be a score for each of a set of pieces of text, each score representing an estimated likelihood that the piece of text is the correct transcript for the utterance. As another example, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken. Thus in general the network input may comprise audio data for performing the audio processing task and the network output may provide a result of the audio processing task e.g. to identify a word or phrase or to convert the audio to text.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output defines a spectrogram or comprises other data defining audio of the text being spoken in the natural language.

As another example, the task can be a health prediction task, where the input is a sequence derived from electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

As another example, the task can be a text generation task, where the input is a sequence of text, and the output is another sequence of text, e.g., a completion of the input sequence of text, a response to a question posed in the input sequence, or a sequence of text that is about a topic specified by the first sequence of text. As another example, the input to the text generation task can be an input other than text, e.g., an image, and the output sequence can be text that describes the input.

As another example, the task can be an image generation task, where the input is a conditioning input and the output is a sequence of intensity values for the pixels of an image.

As another example, the task can be an agent control task, where the input is a sequence of observations or other data characterizing states of an environment, e.g. a video sequence, and the output defines an action to be performed by the agent in response to the most recent data in the sequence. The agent can be a mechanical agent e.g., a real-world or simulated robot, a control system for an industrial facility, or a control system that controls a different kind of agent.

To perform the machine learning task, the system includes an attention neural network that includes multiple layers. Each layer operates on a respective input sequence that includes a respective input vector at each of one or more positions.

Moreover, each of some or all of the layers includes an attention layer and, in some implementations, a feed-forward layer. As used herein an attention layer is a neural network layer which includes an attention mechanism, which optionally may be a self-attention mechanism, a masked attention mechanism, and/or a multi-headed attention mechanism. The attention layer receives the input sequence for the layer and applies an attention mechanism on the input sequence for the layer to generate an attended input sequence.

The exact attention mechanism applied by the attention layer depends on the configuration of the attention neural network, but generally, an attention mechanism maps a query and a set of key-value pairs to an output, where the query, keys, and values are all vectors. The output is computed as a weighted sum of the values, where the weight assigned to each value is computed by a compatibility function of the query with the corresponding key. More specifically, each attention layer can apply a scaled dot-product attention mechanism. In scaled dot-product attention, for a given query, the attention layer computes the dot products of the query with all of the keys, divides each of the dot products by a scaling factor, e.g., by the square root of the dimensions of the queries and keys, and then applies a softmax function over the scaled dot products to obtain the weights on the values. The attention layer then computes a weighted sum of the values in accordance with these weights. Thus, for scaled dot-product attention the compatibility function is the dot product and the output of the compatibility function is further scaled by the scaling factor.

The use of attention mechanisms allows for the neural network to relate different positions of a single sequence in order to compute a representation of the sequence, and thereby effectively learn dependencies between distant positions during training. This can improve the accuracy of the system using the neural network on performing various machine learning tasks that require sequential network inputs.

The feed-forward layer, when included, then operates on the attended input sequence to generate an output sequence for the layer.

Generally, the layers within the attention neural network can be arranged in any of a variety of configurations.

As one example, when the network input is an input sequence, the attention neural network can include an encoder neural network that includes a subset of the plurality of layers and that encodes the input sequence to generate a respective encoded representation of each input in the sequence. In this example, the attention mechanism applied by the layers in the encoder is a self-attention mechanism, e.g., a multi-head self-attention mechanism. In a self-attention mechanism, the input vectors and the memory vectors operated on by the attention mechanism are the same, i.e., the vectors in the input sequence for the layer.

As another example, the attention neural network includes a decoder neural network that includes a different subset of the plurality of layers and that processes either the network input or the encoded representation of the network input to generate the network output.

In some of these examples, when the network output is an output sequence, the decoder neural network operates auto-regressively to generate the outputs in the output sequence and the attention sub-layers within some or all of the layers of the decoder apply masked self-attention over the partially generated output sequence. In masked self-attention, the input vectors and the memory vectors operated on by the attention mechanism are the same, but the attention mechanism is masked so that any given position in the input sequence does not attend over any positions after the given position in the input sequence.

When the neural network includes both an encoder and a decoder, some of the layers in the decoder apply cross-attention into the encoded representations while others apply self-attention over the output sequence, either masked or not masked. When cross-attention is applied, the input vectors are from the input sequence to the layer while the memory vectors are the encoded representations generated by the encoder.

When the attention neural network includes a decoder neural network that operates directly on the input sequence, i.e., includes only a decoder and not an encoder, the attention layers within the decoder can apply a self-attention mechanism over the input sequence.

Particular examples of architectures of attention-based neural networks that include multiple attention layers and that can be modified to include attention layers of the type described in this specification are described in Jacob Devlin, Ming-Wei Chang, Kenton Lee, and Kristina Toutanova. Bert: Pre-training of deep bidirectional transformers for language understanding. In Proceedings of the 2019 Conference of the North American Chapter of the Association for Computational Linguistics: Human Language Technologies, Volume 1 (Long and Short Papers), pp. 4171-4186, 2019; Zihang Dai, Zhilin Yang, Yiming Yang, Jaime Carbonell, Quoc Le, and Ruslan Salakhutdinov. Transformer-XL: Attentive language models beyond a fixed-length context. In Proceedings of the 57th Annual Meeting of the Association for Computational Linguistics, pp. 2978-2988, Florence, Italy, July 2019. Association for Computational Linguistics. doi: 10.18653/v1/P19-1285. URL https://www.aclweb.org/anthology/P19-1285; and Ashish Vaswani, Noam Shazeer, Niki Parmar, Jakob Uszkoreit, Llion Jones, Aidan N. Gomez, Lukasz Kaiser, and Illia Polosukhin. Attention is all you need. Advances in Neural Information Processing Systems, pp. 5998-6008, 2017. URL https://papers.nips.cc/paper/7181-attention-is-all-you-need.pdf. The entire disclosures of these are hereby incorporated by reference herein in their entirety.

Figure 1:
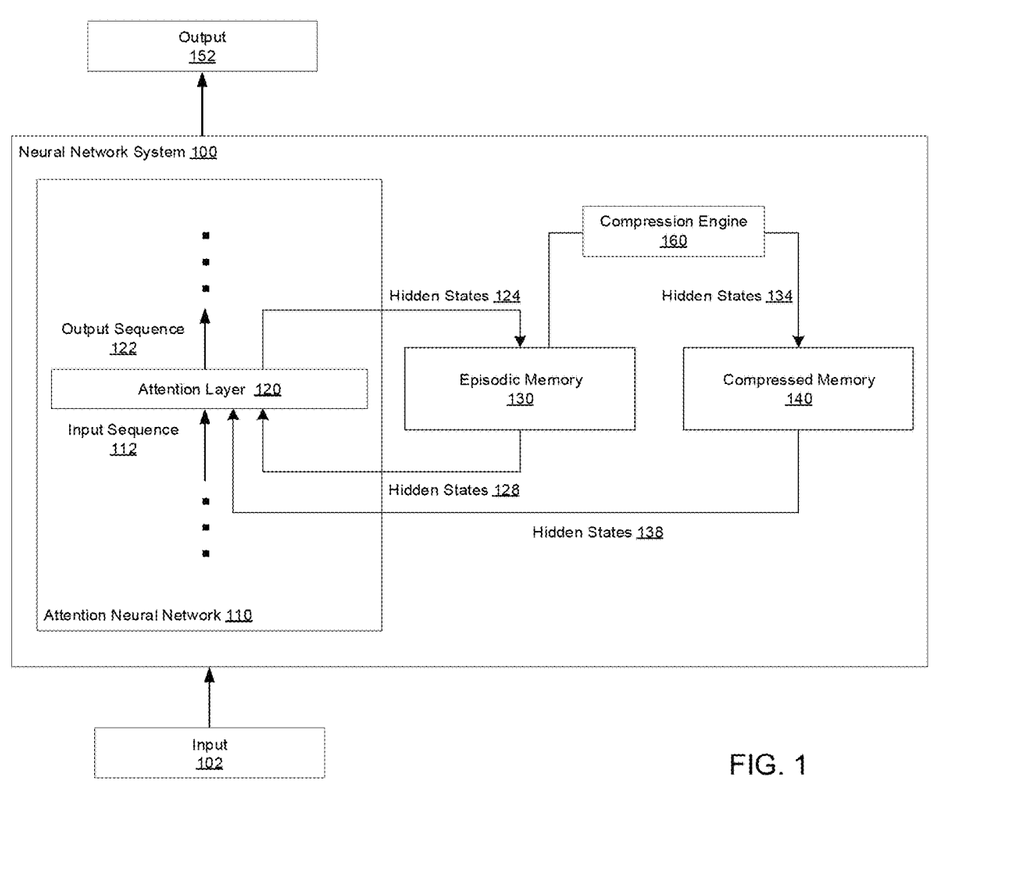
FIG. 1 shows an example attention neural network system.

FIG. 1 shows an example neural network system 100. The neural network system 100 is an example of a system implemented as computer programs on one or more computers in one or more locations, in which the systems, components, and techniques described below can be implemented.

The neural network system 100 can receive an input 102 and perform a machine learning task on the input 102 to generate an output 152.

As described above, the neural network system 100 can perform any of a variety of tasks that involves (i) operating on an input 102 that is an input sequence, (ii) generating an output 152 that is an output sequence, or (iii) both, and more particularly, tasks that require reasoning over long-range sequences, e.g., long-range documents, e.g., multiple contiguous articles or full-length books or long sequences of observations generated while an agent interacts with an environment.

The neural network system 100 includes an attention neural network 110 that includes an attention layer 120. The attention layer 120 operates on an input sequence 112 and generates a corresponding output sequence 122.

In implementations the input 102 comprises a sequence of network inputs each having a respective input at each of a plurality of input positions. Thus the input sequence 112 may be derived from this network input. In general the network output 152 is dependent upon the output sequence 122 from one or more of the attention layers. The network output 152 may provide an output corresponding to each of the input positions. For example in a natural language processing system this may be for determining a word e.g. for a translation of the input, or in a reinforcement learning system for determining an action to be performed at a time step. In a reinforcement learning system each input position may correspond to a time step at which an observation is received.

In some implementations, however, the network output 152 may provide an output corresponding to multiple or all of the input positions. For example the input 102 may comprise an audio or video input, the input positions may be defined by samples of the audio or frames of the video, and the network output 152 may characterize e.g. classify information in the audio or video input e.g. to identify a sound such as a word, or an action or one or more objects depicted by the video.

Although one attention layer is depicted in FIG. 1 for convenience, as described above, the attention neural network 110 may include other layers, including, for example, embedding layers, output layer(s), and more attention layers. Other layers which may be included are (non-linear) activation layers, fully connected layers, and layer normalization layers (arXiv:1607:06450).

In general, the input sequence 112 can be any intermediate sequential data generated by the attention neural network 110 when performing the machine learning task on the input 102. Each input sequence 112 may be a portion of the system input 102 or a segment of an overall sequence derived from the system input 102. Different input sequences 112 can be derived as the system moves through performing the machine learning task by processing different portions of the system input 102. For example, the input sequence 112 can be embedded (i.e., numeric) representations of the system input 102 or a segment of the system input 102 generated by an embedding layer or, more generally, an embedding neural network. Optionally an embedded representation of the input sequence may be combined with an encoding of the respective input positions. As another example, the input sequence 112 can be an output sequence generated by a preceding attention layer or another layer in the attention neural network 110.

Specifically, the input sequence 112 has a respective hidden state input at each of multiple input positions in an input order and the output sequence 122 has a respective activation output at each of multiple output positions in an output order. That is, the input sequence 102 has multiple hidden state inputs arranged according to an input order and the output sequence 122 has multiple activation outputs arranged according to an output order. Thus, in cases where the attention neural network includes a stack of multiple attention layers, the hidden states in the input sequence for each attention layer can generally be the output activations generated by a preceding attention layer in the stack that precedes the attention layer in the attention neural network 110.

One common weakness of attention-based neural networks, even of those augmented with a memory storing reusable information (e.g., past activation outputs at each network layer) generated while processing previous network inputs in a sequence, is the capability in capturing long-term dependencies within the sequence of network inputs. Generally, at each attention layer of the attention neural network, applying an attention mechanism over an input sequence that is of arbitrarily long length, e.g., an input sequence derived from a system input 102 that includes a long-range document with thousands or millions of characters, e.g., a full-length book, can be very expensive and thus suffers from capacity limitations. This is due to the computational cost of attending to every input in an arbitrarily long sequence and, in cases where a memory is used, the storage cost of preserving this large memory.

Thus, to assist in the processing of the input sequence 112 by the attention layer 120, the neural network system 100 maintains (e.g., at one or more physical or logical storage devices) an episodic memory 130 and a compressed memory 140. In cases where the attention neural network 110 includes multiple attention layers, the neural network system 100 can maintain a single memory, i.e., the episodic memory 130 or the compressed memory 140, for all attention layers, or different memories for different attention layers. These memories may, but need not, have a same structure, e.g., a first-in, first out (FIFO)-like structure.

The episodic memory 130 can be implemented as one or more logical or physical storage devices and stores previous layer inputs that were processed by the attention layer 120 when the system was operating on an earlier portion of the system input 102. For example, when the system input 102 is an input sequence, the earlier portion of the system input 102 can include a first portion of previous system inputs that precede the current system input in the sequence, and one or more earlier input sequences to the attention layer 120 can be derived from the first portion of the previous system inputs. That is, the episodic memory 130 stores "episodic memory data", e.g. short-term, granular data, that includes, at respective episodic memory slots, hidden states 124 from the one or more earlier input sequences to the attention layer 120 that immediately precede the current input sequence 112.

The compressed memory 140 stores a second portion of previous layer inputs that were processed by the attention layer 120 when the system was operating an earliest portion of the system input 102 that further precedes the earlier portion of the system input 102. Following the above example, the earliest portion of the system input 102 can include a second portion of previous system inputs that further precedes the first portion of previous system inputs in the system input 102 that is an input sequence, and one or more earliest input sequences to the attention layer 120 can be derived from the second portion of the previous system inputs. That is, the episodic memory 130 stores "compressed memory data" that includes, at respective compressed memory slots, hidden states 134 from the one or more earliest input sequences to the attention layer 120 that further precede the one or more earlier input sequences to the attention layer 120 that immediately precede the current input sequence 112.

As the system 100 moves through performing the machine learning task by processing different portions of the system input 102, the system 100 can determine new compressed memory data from the hidden states currently stored at the episodic memory 130, the hidden states already stored at the compressed memory 140, or both by making use of a compression engine 160 which can implemented, for example, as a compression layer of the attention neural network 110, i.e., a network layer configured to apply a compression function to layer inputs to output a compressed representation of the layer inputs.

Processing each of the plurality of network inputs in a current input sequence 112 while making use of respective hidden states 128 and 138 stored at the episodic and compressed memories will be described in more detail below with reference to FIGS. 2-4.

Briefly, to generate the current output sequence 122 from the current input sequence 112 and from the hidden states stored at the memories, the attention layer 120 is configured to: apply a learned query linear transformation to each hidden state at each input position in the current input sequence to generate a respective query Q for each input position, apply a learned key linear transformation to (i) each hidden state at each input position and to (ii) each hidden state at each slot within the episodic and compressed memories to generate a respective key K for each input position and for each memory slot, and apply a learned value linear transformation to (i) each hidden state at each input position and to (ii) each hidden state at each slot within the episodic and compressed memories to generate a respective value V for each input position and for each memory slot. The attention layer 120 then applies the attention mechanism described above using these queries, keys, and values to determine the output sequence 122 for the input sequence 104. The output sequence 122 generally includes a respective attended vector for each hidden state input at each input position. In general, the queries Q, keys K, and values V are all vectors. As used in this specification, the term "learned" means that an operation or a value has been adjusted during the training of the system.

In some implementations, to allow the attention layer 120 to jointly attend to information from different representation subspaces at different positions, the attention layer 120 employs multi-head attention.

To implement multi-ahead attention, the attention layer 120 applies h different attention mechanisms in parallel. In other words, the attention layer 120 includes h different attention sub-layers, with each attention sub-layer within the same attention layer 120 receiving the same original queries Q, original keys K, and original values V.

Each attention sub-layer is configured to transform the original queries, and keys, and values using learned linear transformations and then apply the attention mechanism to the transformed queries, keys, and values. Each attention sub-layer will generally learn different transformations from each other attention sub-layer in the same attention layer.

In particular, each attention sub-layer is configured to apply a learned query linear transformation to each original query to generate a layer-specific query for each original query, apply a learned key linear transformation to each original key to generate a layer-specific key for each original key, and apply a learned value linear transformation to each original value to generate a layer-specific values for each original value. The attention sub-layer then applies the attention mechanism described above using these layer-specific queries, keys, and values to generate initial outputs for the attention sub-layer.

The attention layer then combines the initial outputs of the attention sub-layers to generate the final output of the attention layer. Specifically, the attention layer can compute a concatenation of the outputs of the attention sub-layers and apply a learned linear transformation to the concatenated output to generate as output an attended input sequence 124. In some cases, the learned transformations applied by attention layer reduce the dimensionality of the original keys and values and, optionally, the queries. For example, when the dimensionality of the original keys, values, and queries is d and there are h attention sub-layers in the attention layer, the attention layer may reduce the dimensionality of the original keys, values, and queries to d/h. This keeps the computation cost of the multi-head attention mechanism similar to what the cost would have been to perform the attention mechanism once with full dimensionality while at the same time increasing the representative capacity of the attention layer.

Figure 2:
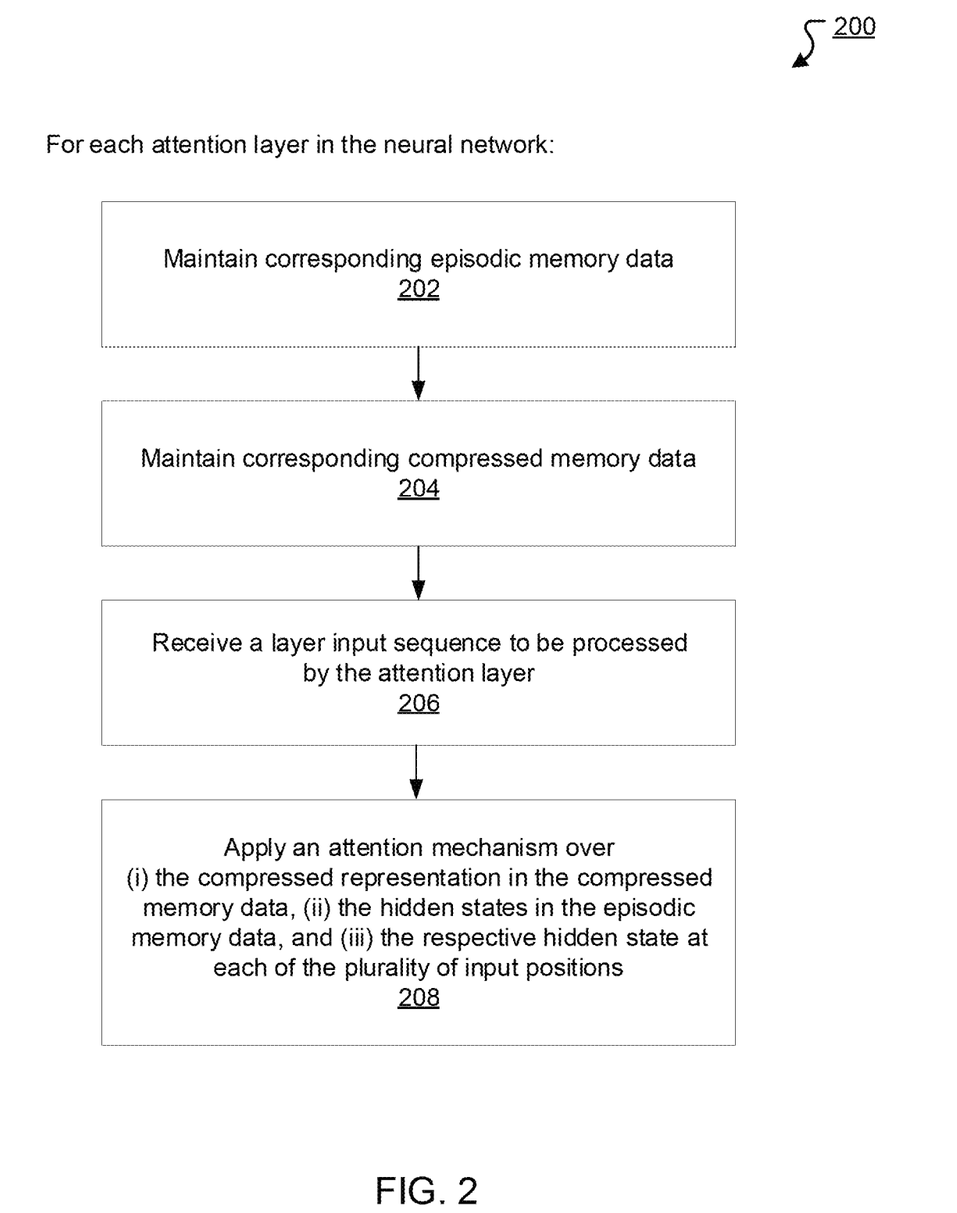
FIG. 2 is a flow diagram of an example process for generating an attention layer output.

FIG. 2 is a flow diagram of an example process 200 for generating an attention layer output. For convenience, the process 200 will be described as being performed by a system of one or more computers located in one or more locations. For example, a neural network system, e.g., neural network system 100 of FIG. 1, appropriately programmed in accordance with this specification, can perform the process 200.

The system can repeatedly perform the process 200 for each sequence of layer inputs. For convenience, each of the steps 202-208 will be described as being performed by each attention layer in an attention neural network and for a "current" sequence of layer inputs.

Typically, the layer input sequence includes a respective hidden sate input at each of the plurality of input positions. As similarly described above, the layer input sequence can be any intermediate sequential data generated by the attention neural network when performing a machine learning task on a system input to generate a system output. Different layer input sequences can be derived as the system moves through performing the machine learning task by processing different portions of the system input.

For example, the layer input sequence can be embedded representations of the system input generated by an embedding layer. As another example, the layer input sequence can be an output sequence generated by a preceding attention layer or other layer in the attention neural network. For example, the respective hidden state inputs in the sequence can be a plurality of activation outputs generated by a preceding attention layer in a stack of attention layers that immediately precedes the given attention layer in the attention neural network.

The system maintains, for the attention layer in the attention neural network, corresponding episodic memory data (202) that includes respective hidden states that were processed by the attention layer when the system was operating on an earlier portion of the system input.

For example, the earlier portion of the system input can include a first portion of previous system inputs that precede the current portion of system inputs in the sequence. For example, the system can do so by maintaining an episodic memory with a fixed size which stores a respective hidden state at each of a plurality of input positions in one or more preceding layer input sequences that has been previously processed by the attention layer when operating on the first portion of system inputs, i.e., prior to processing the current layer input sequence.

The system maintains, for the attention layer in the attention neural network, corresponding compressed memory data (204) that includes a compressed representation of respective hidden states that were processed by the attention layer when the system was operating on an earliest portion of the system input.

For example, the earliest portion of the system input can include a second portion of previous system inputs that further precede the first portion of system inputs. For example, the system can do this by maintaining a compressed memory which stores a respective hidden state at each of a plurality of input positions in one or more earliest layer input sequences that further precede the one or more earlier layer input sequences for which hidden states are stored in the episodic memory.

As will be described below with reference to FIGS. 3-4, the system can use any of a variety of techniques to select the plurality of input positions (the hidden states at which are to be removed from the episodic memory) from all input positions in the one or more earlier layer input sequences. For example always removing the hidden states in the oldest input sequence within the one or more earlier layer input sequences, and storing a compressed representation of the hidden states in the oldest input sequences in the compressed memory. Collectively, the selected hidden states to be stored at the compressed memory are referred to as a compressed representation of respective hidden states that were processed by the attention layer for the second portion of previous system inputs.

The system receives, at the attention layer in the attention neural network, the current layer input sequence to be processed by the attention layer (206) when performing the machine learning task on the current portion of the system input to generate the system output using the attention neural network. The current layer input sequence can have a respective hidden state input at each of a plurality of input positions.

For either episodic or compressed memory, if the current layer input sequence is the very first sequence to be processed by the attention neural network when performing a machine learning task on a network input, the respective hidden states maintained at the memory can each have a respective pre-determined initial value, e.g., zero, negative or positive infinity, or some other predetermined numeric values. These pre-determined initial values are then gradually replaced with updated values specified by the respective hidden states generated by the system as it moves through performing the machine learning task by processing new input sequences.

The system applies an attention mechanism (208) over (i) the compressed representation of respective hidden states in the compressed memory, (ii) the respective hidden states in the episodic memory, and (iii) the respective hidden states at the plurality of input positions in the current layer input sequence to determine a corresponding layer output sequence for the current layer input sequence.

In more detail, the system can apply, e.g., by using the attention layer or another system component, a learned query linear transformation to each hidden state at each input position in the current input sequence to generate a respective query Q for each input position, apply a learned key linear transformation to a concatenated representation of (i) each hidden state at each input position and (ii) each hidden state at each slot within the episodic and compressed memories to generate a respective key K for each input position and for each memory slot, and apply a learned value linear transformation to a concatenated representation of (i) each hidden state at each input position and (ii) each hidden state at each slot within the episodic and compressed memories to generate a respective value V for each input position and for each memory slot. In various implementations, each representation can be in form of a multi-dimensional array, e.g., a vector, and the concatenated representation can be obtained by concatenating two multi-dimensional arrays along a same dimension of the multi-dimensional arrays. The system can then apply the attention mechanism described above using these queries, keys, and values to determine an attended input sequence for the input sequence. The output sequence generally includes a respective attended vector for each hidden state at each input position in the current layer input sequence.

When the attention layer implements multi-head attention, each attention sub-layer in the attention layer is configured to: apply a learned query linear transformation to each layer input at each input position in the current input sequence to generate a respective query Q for each input position, apply a learned key linear transformation to a concatenated representation of (i) each hidden state at each input position and (ii) each hidden state at each slot within the episodic and compressed memories to generate a respective key K for each input position and for each memory slot, apply a learned value linear transformation to a concatenated representation of (i) each hidden state at each input position and (ii) each hidden state at each slot within the episodic and compressed memories to generate a respective value V for each input position and for each memory slot, and then apply the attention mechanism (i.e., the scaled dot-product attention mechanism described above) using the queries, keys, and values to determine an initial attention sub-layer output for each input position and for each memory slot. The attention layer then combines the initial outputs of the attention sub-layers as described above.

In implementations where each attention layer in turn includes a feed-forward layer, the system can use the feed-forward layer to operate on the attended input sequence to generate the output sequence for the attention layer. Alternatively, the system can provide the attended input sequence as the output sequence for the attention layer.

The system then proceeds to update the episodic memory, and, optionally, the compressed memory based on the layer input sequence. Specifically, the system can first update the episodic memory to include the respective hidden states in the current layer input sequence and, thereafter determine whether the episodic memory is "full", that is, whether all available memory slots within the episodic memory have been updated using respective values of the hidden state in the current layer input sequence as a result of performing the process 200 for one or more iterations.

In response to a negative determination, that is, in cases where the current layer input sequence is preceded by less than a predetermined threshold number of layer input sequences, the system can proceed to update the episodic memory data. In some implementations, the predetermined threshold number is defined by the predetermined threshold value of a size of the episodic memory (e.g., in terms of available memory slots each operable to store a corresponding hidden state value).

Specifically, the system can do this by updating respective episodic memory slots to include the values of the hidden states in the current layer input sequence that have been processed by the attention layer to generate the corresponding layer output sequence.

Alternatively, in response to a positive determination, that is, in cases where the current layer input sequence is preceded by more than a predetermined threshold number of layer input sequences, the system can proceed to process 300 for updating the compressed memory data, i.e., in addition to updating the episodic memory after performing process 200.

Figure 3:
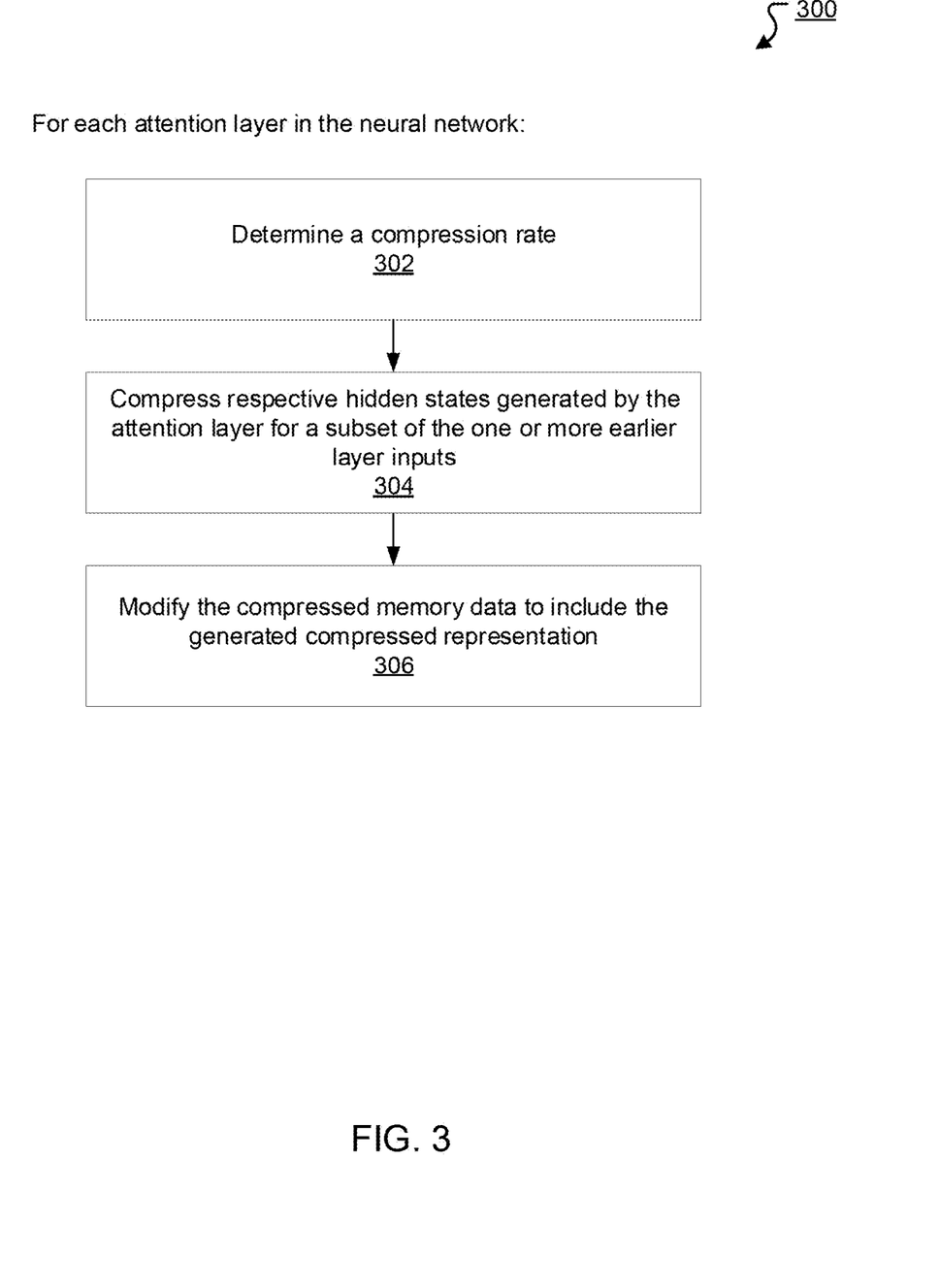
FIG. 3 is a flow diagram of an example process for updating compressed memory associated with an attention layer.

FIG. 3 is a flow diagram of an example process for updating compressed memory associated with an attention layer. For convenience, the process 300 will be described as being performed by a system of one or more computers located in one or more locations. For example, a neural network system, e.g., neural network system 100 of FIG. 1, appropriately programmed in accordance with this specification, can perform the process 300.

The system determines a compression rate c (302) which generally defines a measurement of relative reduction in size of data representation produced by a compression operation. A higher value for the compression rate generally results in a greater reduction in the size of a selected portion of episodic memory data (i.e., in terms of number of hidden states) to be compressed. For example, the system can receive an input from a system user, e.g., through an application programming interface (API) made available by the system, which specifies a value for the compression rate. As another example, the system can select a value for the compression rate, e.g., according to a predefined compression scheme.

The system performs a compression operation $f_c$ in accordance with the compression rate c (304) to compress the respective hidden states in the one or more earlier layer input sequences that were processed by the attention layer when operating on the first portion of the system inputs to generate a compressed representation. In particular, the system can determine the exact size of a subset of the one or more earlier layer input sequences (i.e., how many hidden states to be removed from the episodic memory) based on the compression operation, the size of the episodic or the compressed memory, or a combination thereof. Once determined, the system can perform the compression operation using any of a variety of techniques, update the compressed memory to include the compressed representation, and thereafter remove the corresponding hidden states from the episodic memory.

In some implementations, the system can apply a max pooling function to the respective hidden states processed by the attention layer for the subset of the one or more earlier layer input sequences, with a stride equal to the compression rate. That is, the compression operation can be a max pooling operation and the compressed representation is an output of the max pooling function computed using the hidden states stored at the episodic memory.

In some implementations, the system can apply a mean pooling function to the respective hidden states processed by the attention layer for the subset of the one or more earlier layer input sequences, with a stride equal to the compression rate.

In some implementations, the system can sort the respective hidden states processed by the attention layer for the subset of the one or more earlier layer input sequences in descending order of respective values of the hidden states that are associated with the plurality of input positions in the one or more earlier layer input sequences, and thereafter discard respective hidden states for positions in the subset of the one or more earlier layer input sequences that are associated with the lowest hidden state values.

In some implementations, the system can determine a kernel size for a 1-D convolution function and then apply the 1-D convolution function to the respective hidden states processed by the attention layer for the subset of the one or more earlier layer input sequences, with a stride equal to the compression rate and a kernel size equal to the determined kernel size.

In some implementations, the system can instead apply a derivation of the conventional convolution function, e.g., a dilated 1-D convolution function, to the respective hidden states processed by the attention layer for the subset of the one or more earlier layer input sequences.

In some of these implementations, the system can instead compress, i.e., by applying a compression operation on, both (i) the respective hidden states in the one or more earlier layer input sequences and (ii) the respective hidden states in the one or more earliest layer input sequences that have been processed by the attention layer, or more specifically, the respective hidden states processed by the attention layer that of compression c=3, i.e., every three episodic hidden states are compressed into a single compressed hidden state.

For each attention layer, a set of three hidden states generated from processing the current sequence is moved into respective memory slots within the episodic memory 420. The episodic hidden states already maintained at the episodic memory 420 (as enclosed by the rectangular boxes) are then compacted in accordance with a layer-specific compression function $f_c$ and moved to a single memory slot within the compressed memory 430.

An example algorithm for maintaining memory associated with an attention layer is shown below.

| Algorithm 1 Compressive Transformer | |
|---|---|
| At time zero | |
| 1: $m_0 \leftarrow 0$ | // Initialize memory to zeros $(l \times n_m \times d)$ |
| 2: $cm_0 \leftarrow 0$ | // Initialize compressed memory to zeros $(l \times n_{cm} \times d)$ |
| At time t | |
| 3: $h^{(1)} \leftarrow xW_{emb}$ | // Embed input sequence$(n_s \times d)$ |
| 4: for layer i = 1, 2, . . . , l do | |
| 5:    $mem^{(i)} \leftarrow concat(cm_t^{(i)}, m_t^{(i)})$ | // $(n_{cm} + n_m) \times d$ |
| 6:    $\bar{a}^{(i)} \leftarrow multihead\_attention^{(i)}(h^{(i)}, mem_t^{(i)})$ | // MHA over both mem types $(n_s \times d)$ |
| 7:    $a^{(i)} \leftarrow layer\_norm(\bar{a}^{(i)} + h^{(i)})$ | // Regular skip + layernorm $(n_{cm} \times d)$ |
| 8:    $old\_mem^{(i)} \leftarrow m_t^{(i)}[: n_s]$ | // Oldest memories to be forgotten $(n_s \times d)$ |
| 9:    $new\_cm^{(i)} \leftarrow f_c^{(i)}(old\_mem^{(i)})$ | // Compress oldest memories by factor $c$ $\left(\left\lfloor \frac{n_s}{c} \right\rfloor \times d\right)$ |
| 10:    $m_{t+1}^{(i)} \leftarrow concat(m_t^{(i)}, h^{(i)})[-n_m :]$ | // Update memory $(n_m \times d)$ |
| 11:    $cm_t^{(i)} \leftarrow concat(cm_t^{(i)}, new\_cm^{(i)})[-n_{cm} :]$ | // Update compressed memory $(n_{cm} \times d)$ |
| 12:    $h^{(i+1)} \leftarrow layer\_norm(mlp^{(i)}(a^{(i)}) + a^{(i)})$ | // Mixing MLP $(n_s \times d)$ | were processed by the attention layer when the system was operating on the second portion of system inputs that further precedes the first portion of system inputs. In such implementations, the system can determine an integrally compressed representation of hidden states and previously compressed hidden states stored at the episodic and the compressed memories, respectively.

The system modifies the compressed memory data to include the compressed representation (306), i.e., by replacing respective current values stored at the compressed memory slots with the updated hidden state values specified by the compressed representation generated from step 304. The corresponding hidden states based on which the compressed representation is generated are then discarded from the episodic memory to make space for new hidden states in the upcoming layer input sequences. Previously compressed hidden states may be discarded from the compressed memory as newly compressed hidden states become available during operation of the system, for example discarding the oldest first. In implementations, however, some or all of the compressed hidden states are retained in the compressed memory throughout the performance of the machine learning task.

Figure 4:
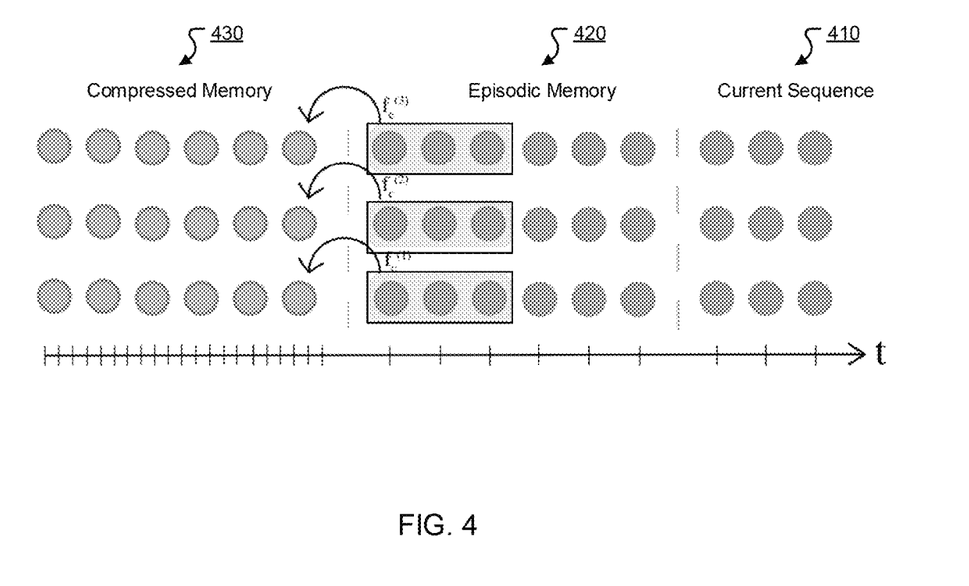
FIG. 4 is an illustration of maintaining memories associated with an attention layer.

FIG. 4 is an illustration of maintaining memories associated with an attention layer. In the example of FIG. 4, the attention neural network includes three attention layers each configured to receive a sequence of length $n_s$=3, i.e., an input sequence 410 ("current sequence") having a respective hidden state at each of three input positions in an input order. Each attention layer is associated with an episodic memory 420 of size $n_m$=6, i.e., a memory configured to store a respective episodic hidden state at each of six memory slots, and a compressed memory 430 of size $n_{cm}$=6, i.e., a memory configured to store a respective compressed hidden state at each of six memory slots. In the example of FIG. 4, the rate In the example algorithm shown above, $n_m$ and $n_{cm}$ are the number of respective memory and compressive memory slots in each attention layer of the attention neural network. The overall input sequence $S=X_1, X_2, \ldots, X_{|s|}$ represents input to the system (e.g. tokens from a book). These are split into fixed-size windows of size $n_s$ for the attention neural network to process in parallel. The attention neural network receives $x=x_t, \ldots, x_{t+n_s}$ at time t (referred to as the "current sequence" 410 in FIG. 4). As the attention neural network moves to the next sequence, its $n_s$ hidden states are pushed into a fixed-size, first-in-first out (FIFO) memory (referred to as the "episodic memory" 420 in FIG. 4). The oldest $n_s$ hidden states in memory are removed, processed using a compression operation $f_c$:

$$R^{n_s \times d} \rightarrow R^{\lfloor \frac{n_s}{c} \rfloor \times d},$$

mapping the $n_s$ oldest memories to $$\left\lfloor \frac{n_s}{c} \right\rfloor$$

compressed memories to be store in a secondary FIFO memory (referred to as the "compressed memory" 430 in FIG. 4). d denotes the hidden size of hidden states. c refers to the compression rate, where a higher value indicates more coarse-grained compressed memories.

The process 200 or 300 can be performed for each sequence of layer inputs to generate a sequence of layer outputs for the sequence of layer inputs, from which a system output may be derived. The sequence of layer inputs can be a sequence for which the desired output, i.e., the output sequence that should be generated by the attention layer for the input sequence, is not known. The system can also perform the process 200 or 300 on inputs in a set of training data, i.e., a set of inputs for which the output that should be predicted by the attention layer is known, in order to train the system, i.e., to determine trained values for the parameters of the attention neural network and, in some implementations, any additional parameters required for maintaining the one or more memories associated with the network.

During the training of the attention neural network, the process 200 or 300 can be performed repeatedly on inputs selected from a set of training data as part of a conventional machine learning training technique to train the attention neural network, e.g., Adam or Adam with backpropagation through time training, which generally involves iteratively updating respective parameter values of the attention neural network based on a computed gradient of an objective function.

The system can also perform the process 200 or 300 together with any of a variety of other training techniques that are considered (e.g., by a system operator) advantageous in terms of wall-clock time or computational resources, e.g., memory, computing power, or both. For example the system can train the system in accordance with dynamic parameter update frequencies, e.g., by gradually increasing a number of training neural network inputs to be processed by the attention neural network between every two consecutive parameter value updates. Some implementations of the system may clip gradients during training and/or may use a learning rate schedule which has a warmup phase, when it increases, then a decay phase.

An example algorithm for computing an objective function evaluating an attention-reconstruction loss for use in the training of the system is shown below.

---

Algorithm 2 Attention-Reconstruction Loss

1: $L^{atm} \leftarrow 0$
2: for layer i = 1, 2, . . . , l do
3:     $h^{(i)} \leftarrow \text{stop\_gradient}(h^{(i)})$      // Stop compression grads from passing...
4:     $\text{old\_mem}^{(i)} \leftarrow \text{stop\_gradient}(\text{old\_mem}^{(i)})$      // ...into transformer network.
5:     $Q, K, V \leftarrow \text{stop\_gradient}(\text{attention params at layer i})$ // Re-use attention weight matrices.
6:     def attn(h, m) $\leftarrow \sigma((hQ)(mK))(mV)$      // Use content-based attention (no relative).
7:     $\text{new\_cm}^{(i)} \leftarrow f_c^{(i)}(\text{old\_mem}^{(i)})$      // Compression network (to be optimized).
8:     $L^{atm} \leftarrow L^{atm} + \|\text{attn}(h^{(i)}, \text{old\_mem}^{(i)}) - \text{attn}(h^{(i)}, \text{new\_cm}^{(i)})\|_2$

---

In some implementations, the objective function that is being optimized includes, in addition to one or more terms that penalize the system for generating incorrect system outputs, one or more terms that penalize the system for information loss caused by compression. In this way, the attention neural network can be trained to generate high quality system outputs through effectively reasoning over respective inputs within or derived from a system input. For example, the objective function includes one or more terms that evaluate auxiliary compression losses. For example, such auxiliary compression loss can be a lossless compression objective measured in terms of a difference between a reconstruction of compressed memory content and the original, uncompressed episodic memory content. As another example, such auxiliary compression loss can be a lossy compression objective measured in terms of a difference between content-based attentions (i.e., attended layer outputs generated from attending over episodic memory content) and memory-based attentions (i.e., attended layer outputs generated from attending over compressed memory content).

In particular, training the system using an objective function that penalizes the system for incorrect system outputs and the training of the system using an objective function that penalizes the system for losing attention information due to suboptimal compression strategies can be performed either jointly, e.g., through backpropagation of compression loss gradients into the network parameters of the attention neural network, or separately, e.g., with a stop-gradient operator applied to the compressed representation maintained in the compressed memory for the attention layer, the hidden states maintained in the episodic memory data for the layer, or both. The stop-gradient operator prevents compression loss-related gradients from passing into the network parameters of the attention neural network, and thereby focuses on the task-related training of the attention neural network.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   receiving a sequence of network inputs, wherein each network input is an input sequence that comprises a plurality of input positions;
   processing the sequence of network inputs using a neural network to generate a network output, wherein the neural network comprises an attention layer associated with a short-term, episodic memory and a long-term, compressed memory, and wherein the processing comprises, for a particular network input in the sequence of network inputs:
      updating the short-term, episodic memory to include new data, the new data comprising respective hidden states that were processed by the attention layer for a plurality of input positions in the particular network input;
      determining a compression rate for a portion of existing data stored in the short-term, episodic memory, the portion of existing data comprising respective hidden states that were processed by the attention layer for a plurality of input positions in each of one or more previous network inputs that precede the particular network input in the sequence of network inputs;
      compressing, in accordance with the compression rate, the portion of existing data to generate a compressed representation for the portion of existing data; and
      updating the long-term, compressed memory to include the compressed representation for the portion of existing data.

2. The method of claim 1, further comprising deleting the portion of existing data from the short-term, episodic memory.

3. The method of claim 1, wherein the processing comprises, for each input position in the plurality of input positions included in the particular network input:
   applying an attention mechanism over (i) data stored in the long-term, compressed memory associated with the attention layer, (ii) data stored in the short-term, episodic memory associated with the attention layer, and (iii) respective hidden states that were processed by the attention layer for one or more input positions that precede the input position in the plurality of input positions, to generate an activation for the input position.

4. The method of claim 1, wherein compressing, in accordance with the compression rate, the portion of existing data comprises:
   applying a max pooling function to the portion of existing data with a stride equal to the compression rate.

5. The method of claim 1, wherein compressing, in accordance with the compression rate, the portion of existing data comprises:
   applying a mean pooling function to the portion of existing data with a stride equal to the compression rate.

6. The method of claim 1, wherein compressing, in accordance with the compression rate, the portion of existing data comprises:
   determining a kernel size for a 1D convolution function; and
   applying the 1D convolution function to the portion of existing data with a stride equal to the compression rate and a kernel size equal to the determined kernel size.

7. The method of claim 1, wherein compressing, in accordance with the compression rate, the portion of existing data comprises:
   applying a multi-layer dilated 1D convolution function to the portion of existing data.

8. The method of claim 1, wherein the one or more previous network inputs further precede one or more other network inputs that precede the particular network input in the sequence of network inputs.

9. The method of claim 8, wherein a number of the one or more other network inputs is dependent on a predetermined size of the short-term, episodic memory.

10. The method of claim 1, wherein the processing comprises:
    processing activations generated by the attention layer for the plurality of input positions using one or more fully connected layers and one or more layer normalization layers included in the neural network.

11. The method of claim 1, wherein the sequence of network inputs comprises data derived from a sequence of multiple articles from a text document.

12. The method of claim 1, wherein the sequence of network inputs comprises data derived from a sequence of multiple observations generated while an agent interacts with an environment.

13. A system comprising:
one or more computers; and
one or more storage devices storing instructions that, when executed by the one or more computers, cause the one or more computers to perform operations comprising:
receiving a sequence of network inputs, wherein each network input is an input sequence that comprises a plurality of input positions;
processing the sequence of network inputs using a neural network to generate a network output, wherein the neural network comprises an attention layer associated with a short-term, episodic memory and a long-term, compressed memory, and wherein the processing comprises, for a particular network input in the sequence of network inputs:
updating the short-term, episodic memory to include new data, the new data comprising respective hidden states that were processed by the attention layer for a plurality of input positions in the particular network input;
determining a compression rate for a portion of existing data stored in the short-term, episodic memory, the portion of existing data comprising respective hidden states that were processed by the attention layer for a plurality of input positions in each of one or more previous network inputs that precede the particular network input in the sequence of network inputs;
compressing, in accordance with the compression rate, the portion of existing data to generate a compressed representation for the portion of existing data; and
updating the long-term, compressed memory to include the compressed representation for the portion of existing data.

14. The system of claim 13, wherein the processing comprises:
processing activations generated by the attention layer for the plurality of input positions using one or more fully connected layers and one or more layer normalization layers included in the neural network.

15. The system of claim 13, wherein the sequence of network inputs comprises data derived from a sequence of multiple articles from a text document.

16. The system of claim 13, wherein the sequence of network inputs comprises data derived from a sequence of multiple observations generated while an agent interacts with an environment.

17. One or more non-transitory computer-readable storage media storing instructions that when executed by one or more computers cause the one or more computers to perform operations comprising:
receiving a sequence of network inputs, wherein each network input is an input sequence that comprises a plurality of input positions;
processing the sequence of network inputs using a neural network to generate a network output, wherein the neural network comprises an attention layer associated with a short-term, episodic memory and a long-term, compressed memory, and wherein the processing comprises, for a particular network input in the sequence of network inputs:
updating the short-term, episodic memory to include new data, the new data comprising respective hidden states that were processed by the attention layer for a plurality of input positions in the particular network input;
determining a compression rate for a portion of existing data stored in the short-term, episodic memory, the portion of existing data comprising respective hidden states that were processed by the attention layer for a plurality of input positions in each of one or more previous network inputs that precede the particular network input in the sequence of network inputs;
compressing, in accordance with the compression rate, the portion of existing data to generate a compressed representation for the portion of existing data; and
updating the long-term, compressed memory to include the compressed representation for the portion of existing data.

18. The non-transitory computer-readable storage media of claim 17, wherein the processing comprises:
processing activations generated by the attention layer for the plurality of input positions using one or more fully connected layers and one or more layer normalization layers included in the neural network.

19. The non-transitory computer-readable storage media of claim 17, wherein the sequence of network inputs comprises data derived from a sequence of multiple articles from a text document.

20. The non-transitory computer-readable storage media of claim 17, wherein the sequence of network inputs comprises data derived from a sequence of multiple observations generated while an agent interacts with an environment.

* * * * *